United States Patent
Janko et al.

(10) Patent No.: US 6,795,580 B1
(45) Date of Patent: Sep. 21, 2004

(54) PICTURE QUALITY MEASUREMENT USING BLOCKINESS

(75) Inventors: Bozidar Janko, Portland, OR (US); Steven D. Maurer, Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/152,495

(22) Filed: Sep. 10, 1998

(51) Int. Cl.⁷ .............................................. G06K 9/48
(52) U.S. Cl. ...................... 382/199; 348/14.12; 348/92; 348/193; 348/625; 382/112; 382/266; 382/274; 455/135; 455/226.3; 702/69; 702/81
(58) Field of Search ............................... 382/112, 266, 382/269, 278–279, 199; 348/625, 699, 14.12, 92, 180, 184, 192–193; 702/69, 81, 84; 455/135, 226.3

(56) References Cited

U.S. PATENT DOCUMENTS

| | | | | |
|---|---|---|---|---|
| 4,246,608 A | * | 1/1981 | Baker .......................... | 348/192 |
| 4,839,727 A | * | 6/1989 | Tanaka et al. .............. | 348/618 |
| 5,410,356 A | * | 4/1995 | Kikuchi et al. ............. | 348/452 |
| 5,446,492 A | | 8/1995 | Wolf | |
| 5,479,215 A | * | 12/1995 | Chmielewski et al. ...... | 348/627 |
| 5,541,668 A | * | 7/1996 | Kuwahara et al. .......... | 348/624 |
| 5,550,937 A | * | 8/1996 | Bell et al. ................... | 382/293 |
| 5,583,579 A | * | 12/1996 | Shim .......................... | 348/668 |
| 5,661,527 A | * | 8/1997 | Ferguson .................... | 348/558 |
| 5,748,231 A | * | 5/1998 | Park et al. .................. | 348/208 |
| 5,796,875 A | * | 8/1998 | Read .......................... | 382/261 |
| 5,832,101 A | * | 11/1998 | Hwang et al. .............. | 382/107 |
| 5,844,614 A | * | 12/1998 | Chong et al. .......... | 375/240.24 |
| 5,886,745 A | * | 3/1999 | Muraji et al. ............... | 348/448 |
| 5,905,541 A | * | 5/1999 | Yun ............................ | 348/687 |
| 5,920,356 A | * | 7/1999 | Gupta et al. ................ | 348/606 |
| 5,933,543 A | * | 8/1999 | Cok ............................ | 382/264 |
| 5,963,677 A | * | 10/1999 | Schrick et al. .............. | 382/278 |
| 6,018,361 A | * | 1/2000 | Fujii et al. .................. | 348/180 |
| 6,038,339 A | * | 3/2000 | Hubel et al. ................ | 382/162 |
| 6,075,884 A | * | 6/2000 | Lubin et al. ................ | 382/156 |
| 6,078,689 A | * | 6/2000 | Kunitake et al. ........... | 382/232 |
| 6,097,848 A | * | 8/2000 | Salvati ....................... | 382/266 |
| 6,101,222 A | * | 8/2000 | Dorricott .................... | 375/240 |
| 6,137,824 A | * | 10/2000 | Liu ............................. | 375/130 |
| 6,154,577 A | * | 11/2000 | Warnick et al. ............. | 382/279 |
| 6,239,834 B1 | * | 5/2001 | Miyaji et al. ............... | 348/193 |
| 6,272,253 B1 | * | 8/2001 | Bannon et al. ............. | 382/236 |
| 6,408,109 B1 | * | 6/2002 | Silver et al. ................ | 382/300 |
| 6,418,242 B1 | * | 7/2002 | Maurer ....................... | 382/266 |
| 6,434,275 B1 | * | 8/2002 | Fukuda et al. .............. | 382/275 |
| 6,535,254 B1 | * | 3/2003 | Olsson et al. ............... | 348/607 |
| 6,594,595 B2 | * | 7/2003 | Yamaguchi et al. .......... | 702/69 |

OTHER PUBLICATIONS

G. Beakley, C. Cressy, and J. Van Pelt, "Video Compression: The Need for Testing" SMPTE Journal, Nov. 1995, Vo. 104, No. 11, pp. 742–750.

* cited by examiner

*Primary Examiner*—Bhavesh M. Mehta
*Assistant Examiner*—Gregory Desire
(74) *Attorney, Agent, or Firm*—Francis I. Gray

(57) ABSTRACT

A picture quality measurement technique using blockiness provides realtime analysis without the use of a reference signal. A field/frame of an image represented by a processed video signal is captured in a bit-map for analysis. The image is filtered to enhance edges and then correlated with a kernel having a size corresponding to the block size of the compression algorithm used in compressing and decompressing the video signal to produce the processed video signal. The correlation results are processed by comparing an average value with the maximum value to produce a picture quality rating for the processed video signal.

10 Claims, 1 Drawing Sheet

PICTURE QUALITY MEASUREMENT USING BLOCKINESS

BACKGROUND OF THE INVENTION

The present invention relates to picture quality measurement, and more particularly to picture quality measurement using blockiness.

In digital video transmission where bandwidth is important, such as transmission over satellite link, the video signal is subjected to varying degrees of compression to decrease the bandwidth required for each video channel. The compression standards typically used, such as JPEG, MPEG or proprietary variants thereof, are "lossy"—to achieve higher compression they allow distortions to occur in an image represented by the video signal. The amount of distortion is a function of the complexity of the image and of the number of bits per second (bit rate) a compression encoder is allowed to use. Ideally the amount of compression is maximized while still providing a video image or picture to the customer that is free of disturbing artifacts.

Current devices to analyze picture quality, such as the PQA200 Picture Quality Analyzer manufactured by Tektronix, Inc. of Wilsonville, Oreg., USA, are reference-based. A video signal transmitted through a video system is compared with the original video signal as a reference video signal in a measurement device. The reference video signal is either stored in the measurement device or is transmitted via some other non-distorted pathway to the measurement device. Use of a reference video signal is necessary for extremely accurate algorithms, such as the Sarnoff Corporation JNDmetrix™ human visual model algorithm. However, this means that measurements are only made on video signals whose contents are either known in advance or are immediately available, such as double-checking an encoder at the source.

Other potential methods of measuring discrete cosine transform (DCI) based codec degradations involve directly examining the coarseness of the quantization scale in the compressed video stream, optionally combined with a measure of the complexity of the original image transmitted by some means outside the video channel—a form of compressed reference. This method is not as accurate, and in any case can only make measurements on compressed video, not video that has been already decompressed and potentially passed through other systems, including other additional codecs, prior to end-user delivery.

What is desired is a method of monitoring distortions in block-based codecs in a manner that is truly reference-less and which uses the minimum amount of hardware acceleration to perform such measurements in real time.

BRIEF SUMMARY OF THE INVENTION

Accordingly the present invention provides a picture quality measurement system using blockiness to determine the amount of degradation of a video signal due to video compression processing. A frame/field of a processed video signal representing an image or picture is captured and converted, if necessary, into luminance and color components. One or more of the components is analyzed by appropriate vertical and/or horizontal edge enhancement filtering, such as boxcar filtering. The resulting edges are correlated with an infinite grid having boundaries corresponding to the block boundaries used in the video compression. Optionally a second correlation may be made with a grid with boundaries slightly different than the block boundaries used in the video compression, with this result being subtracted from the first value. Further the locations of the compression block boundaries may be detected by observing where the maximum correlation value occurs. The resulting correlation results are processed to generate a picture quality rating for the image which represents the amount of human-perceivable block degradation that has been introduced into the processed video signal.

The objects, advantages and other novel features of the present invention are apparent from the following detailed description when read in conjunction with the appended claims and attached drawing.

DETAILED DESCRIPTION OF THE INVENTION

Figure 1:
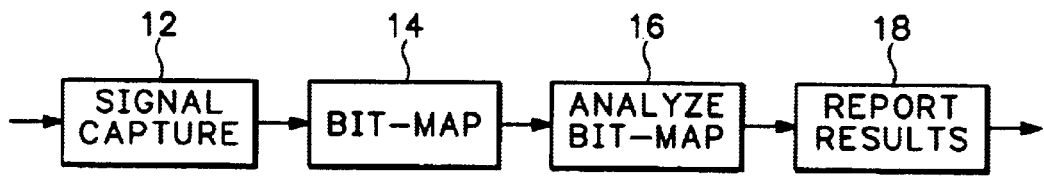
FIG. 1 is a block diagram view of a picture quality measurement system according to the present invention.

Most compression systems today separate video into blocks of data and separately compress each block using a discrete cosine transform (DCT). Research shows that in video which has been subjected to such compression, image or picture quality is strongly correlated with the visible blockiness appearance that overly aggressive quantization can impart, especially in scenes which lack textural frequencies in the underlying scene that would otherwise mask the defects. Referring now to FIG. 1 a processed video signal that has been compressed and decompressed at least once and that is to be measured for picture quality degradation is input to a signal capture module 12 where an image field/frame is captured and converted to component video if necessary, the active picture data of which is stored in a bit-map 14. The contents of the bit-map 14, typically the luminance component of the video data, are processed by a bit-map or video data analyzer 16, and the resulting picture quality rating is provided to a report results module 18 for display to a user/operator.

Figure 2:
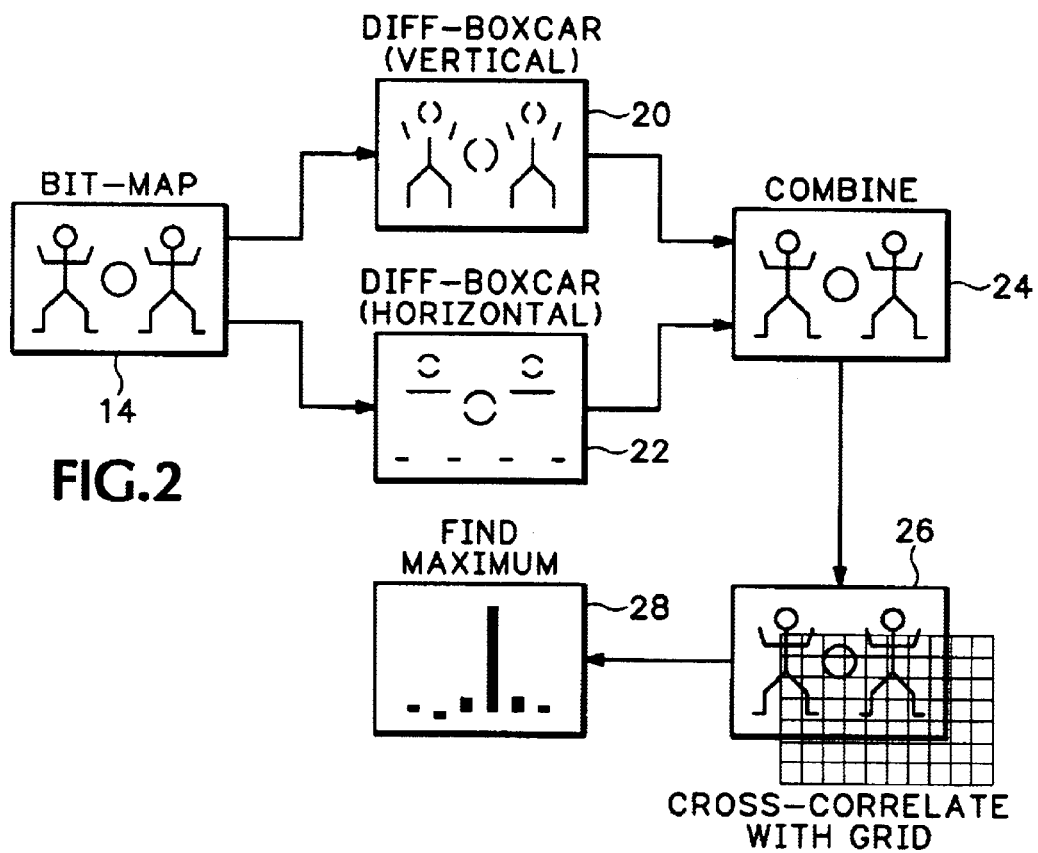
FIG. 2 is an illustrative view of the extraction of blockiness from a bit-map for a picture quality measurement system according to the present invention.

As shown in FIG. 2 one or more of the video components of the image from the bit-map 14 is processed by a pair of edge-enhancement filters 20, 22, such as boxcar filters, one processing vertical edges in the image and the other horizontal edges. The resulting edge images are input to a combining module 24 where the absolute values of the edge images are combined geometrically for the two dimensions. The combined image is input to a correlation module 26 where the combined image is cross-correlated with an infinite grid which has "1"s on rows that are multiples of four and on columns that are multiples of eight and zeros elsewhere, adjusted so that the mean is zero, i.e., a grid having a kernel corresponding to the block size of the compression standard used. The cross-correlation results are input to respective bins 28, with the maximum value being a measure of the blockiness of the bit-map image.

To improve efficiency in order to perform the analysis in real time on more limited hardware, the blockiness extraction algorithm may be reduced by only performing it in one dimension, such as the vertical dimension, and eliminating the combiner 24. This latter vertical algorithm further may be rearranged so that the digital filtering occurs as the video data is being acquired, eliminating the need for the bit-map storage 14 as well. The single direction digital filtering is simple enough to be implemented only by "add" operations, as illustrated in the following segment of Matlab code:

```
% These commands extract vertical edges:
s =    (1 -1                //Edge enhancement filter//
        1 -1
        1 -1
        1 -1);
VV = conv2(lum,s)
```

//Sum of four pixels in each image column are subtracted from the sum of its four neighboring pixels to the left, which may be implemented by keeping a running total of four lines throughout the image and subtracting each running sum from its neighbor.//

```
VV = abs(VV)             //Absolute value of sum of differences//
V = VV(10:210, 10:676); //Optional clipping//
% Here is the efficient cross-correlation algorithm:
f = zeros(1,8);          //Create and zero 8 buckets//
VR = length(V(:,1));     //Get picture height//
VC = length(V(1,:));     //Get picture Width//
VCF8 = floor(VC/8)*8 - 8; //Round width down to nearest x8//
for i = 1:VR
    for j = 0:8:VCF8
        for k = 1:8
            f(k) = f(k) + V(i, j+k);
        end
    end
end
```

//Sum the differences into the eight buckets with each bucket containing the total of all the columns by modulo eight (bucket #1 contains the sum of difference columns 1, 9, 17 . . . , bucket #2 contains the sum of difference columns 2, 10, 18 . . . , etc.).//

$S = \text{sum}(f)/8;$ block_defect_measure =(max(f)-S)* scale_constant

//The average of the values for all the buckets is subtracted from the value in the bucket having the maximum value. The resulting number is multiplied by a fixed scaling value to yield a number in the same range as the Picture Quality Rating (PQR) produced by a device like the PQA200.// This algorithm may be applied to 16×16 macroblocks in color channels, and/or any other macroblock size if the compression standards change. Additionally the particular bucket that contains the maximum value also indicates where the compression block boundary is, which also may be output to the report module 18.

Figure 3:
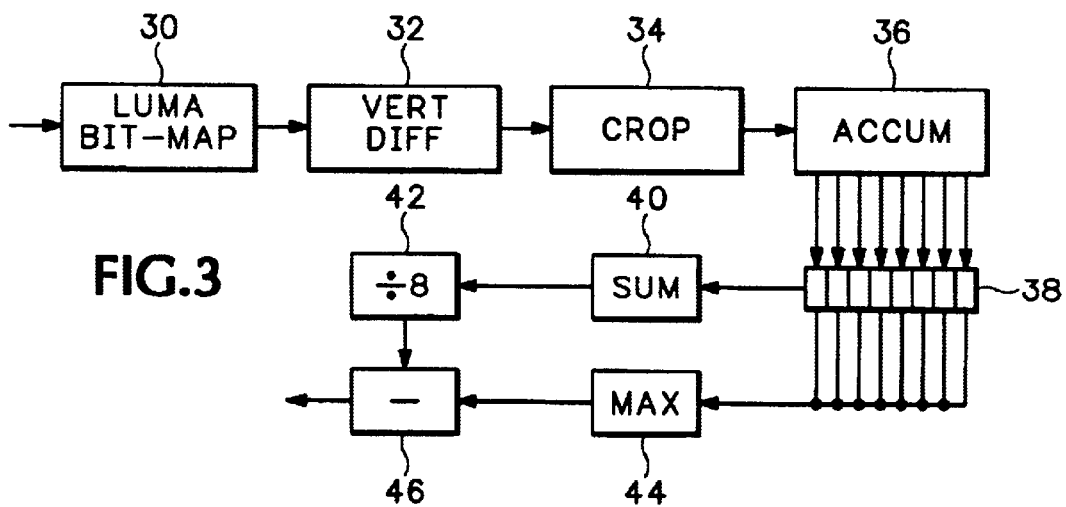
FIG. 3 is a block diagram view of a block detection apparatus for a picture quality measurement system according to the present invention.

Although the algorithm may be implemented in a microprocessor/memory environment, as described above, for special algorithms with high speed data, such as for HDTV applications, it may be implemented in hardware as shown in FIG. 3. The separated component of the image is input to the field bit-map 30. The component is then input from the bit-map 30 to a vertical differencing circuit 32. The differenced values are input to a crop module 34 and then input to an accumulator 36 that accumulates the difference values into eight buckets 38. After the image has been accumulated the outputs from the buckets 38 are input to a summation module 40, and the sum is input to an averaging module 42 that divides the sum by the number of bins, eight in this example or a right shift of two bits. The maximum value from the buckets 38 is extracted by a maximum detector 44 and input to a subtractor 46 where it is subtracted from the averaged sum of the values from the buckets. The resulting output is then forwarded to the report results module 18 for display to the user/operator.

To improve the accuracy the algorithm may be changed by performing the blockiness measure as above with correlation to the specific block or macroblock spacing, and then repeated, or simultaneously calculated, using a non-block correlated kernel size, such as 9. The result from the second correlation is subtracted from the result for the first correlation to arrive at the PQR. If the result is less than zero, it is set to zero. This significantly reduces false positives in blockiness that a noisy image might otherwise produce.

The location of the compression blocks, whether they are human-perceivable or not, may also be determined and separately reported, either to the operator or to other image impairment analysis algorithms. The method used is simply to report which of the correlation accumulation buckets holds the largest accumulated absolute difference value.

Thus the present invention provides for picture quality analysis using blockiness by determining the edges in an image represented by a video signal, correlating the edges with a block-size kernel, and subtracting the average sum of the correlation results from a maximum correlation value to produce a measure of the degradation of the video signal.

What is claimed is:

1. A method of measuring picture quality of an image represented by a processed video signal based upon blockiness comprising the steps of:
   determining values for edges in the image;
   correlating the edge values with a kernel having spacing corresponding to a specified block size to produce n correlation values; and
   generating from the correlation values a picture quality rating value.

2. The method as recited in claim 1 wherein the determining step comprises the steps of:
   storing in a bit-map the image from the video signal; and
   processing the image from the bit-map with a first filter function in a first direction to provide the edge values.

3. The method as recited in claim 2 wherein the determining step further comprises the steps of:
   processing the image from the bit-map with a second filter function in a second direction orthogonal to the first direction to provide the edge values; and
   combining the edge values from the two processing steps to produce the edge values for input to the correlating step.

4. The method as recited in claims 2 or 3 wherein the processing step comprises the steps of:
   obtaining the differences between adjacent pixels; and
   summing the differences for each pixel on a modulo n basis.

5. The method as recited in claim 4 further comprising the step of converting the differences to absolute values before the summing step.

6. The method as recited in claim 1 wherein the generating step comprises the steps of:
   calculating an average for the correlation values; and
   subtracting the average from a maximum one of the correlation values to produce a quality measure as the picture quality rating.

7. The method as recited in claim 6 wherein the generating step further comprises the step of scaling the quality measure by a fixed constant to produce the picture quality rating.

8. The method as recited in claim 1 further comprising the steps of:

repeating the correlating and generating steps with a kernel having a size other than the specified block size; and subtracting the results of the generating steps to produce the picture quality rating.

9. The method as recited in claim 8 further comprising the step of scaling the results of the subtracting step by a fixed constant to produce the picture quality rating.

10. The method as recited in claim 1 further comprising the step of determining from the correlation values a block location for the specified block.

* * * * *